United States Patent [19]

Hattori et al.

[11] Patent Number: 4,702,138

[45] Date of Patent: Oct. 27, 1987

[54] CUTTING APPARATUS FOR CERAMIC GREEN SHAPED BODIES

[75] Inventors: Isao Hattori, Nagoya; Akio Enomoto, Chita, both of Japan

[73] Assignee: NGK Insulators, Ltd., Aichi, Japan

[21] Appl. No.: 841,613

[22] Filed: Mar. 20, 1986

[30] Foreign Application Priority Data

Apr. 13, 1985 [JP] Japan .................... 60-77537

[51] Int. Cl.⁴ .................... B26D 1/547; B26D 1/60
[52] U.S. Cl. .................... 83/785; 83/307.2; 83/647; 83/651.1; 125/16 R
[58] Field of Search ........... 83/307.1, 307.2, 651.1, 83/783–786, 647.5, 646; 125/16 R

[56] References Cited

U.S. PATENT DOCUMENTS

| | | | |
|---|---|---|---|
| 541,160 | 6/1895 | Garland | 83/785 |
| 1,088,092 | 2/1914 | Reichlinger | 83/647 X |
| 2,599,920 | 6/1952 | Jakobsson et al. | 125/16 R |
| 2,641,042 | 6/1953 | Kopp | 83/307.2 |
| 3,055,251 | 9/1962 | Krikorian | 83/587 |
| 4,018,117 | 4/1977 | Patterson | 83/651.1 X |
| 4,175,455 | 11/1979 | Genis et al. | 83/307.2 X |
| 4,258,763 | 3/1981 | Figuerado et al. | 83/651.1 X |
| 4,393,450 | 7/1983 | Jerard | 125/16 R |
| 4,528,883 | 7/1985 | Goransson et al. | 83/870 |

FOREIGN PATENT DOCUMENTS

| | | |
|---|---|---|
| 551624 | 6/1932 | Fed. Rep. of Germany . |
| 2353085 | 4/1975 | Fed. Rep. of Germany . |
| 498121 | 9/1954 | Italy ........ 83/783 |

Primary Examiner—Frank T. Yost
Attorney, Agent, or Firm—Parkhurst & Oliff

[57] ABSTRACT

A cutting apparatus for ceramic green shaped bodies is disclosed, which comprises a cutting frame having two arm portions arranged side by side in the widthwise direction of the ceramic green shaped body. A cutting fine wire directly extends about the two arm portions through a roll arranged in each of the arm portions. The arm portions are moved toward a cutting direction of the ceramic green shaped body to move the cutting fine wire extended about the rolls into the ceramic green shaped body to cut it. The cutting fine wire is moved reciprocally during the moving of the cutting fine wire across the ceramic green shaped body, and while moving the arm portions toward the cutting direction of the ceramic green shaped body.

3 Claims, 5 Drawing Figures

FIG_2

CUTTING APPARATUS FOR CERAMIC GREEN SHAPED BODIES

BACKGROUND OF THE INVENTION

1. Field of the Invention

This invention relates to a cutting apparatus for ceramic green shaped bodies which can rapidly cut a soft and deformable shaped body such as a ceramic green shaped body or the like without deformation.

2. Related Art Statement

As an example of the ceramic green shaped bodies, there is an extrusion molded body obtained by extrusion molding in the manufacturing course of ceramic honeycomb structures. This extrusion molded body is continuously extruded from an extrusion molding apparatus and cut into single parts of a given length, which are dried and fired to form ceramic honeycomb structures.

Heretofore, such a cutting of the extrusion molded body has almost been performed by manual operation of skilled workers. Because, the extrusion molded body is a soft ceramic green shaped body, and particularly the ceramic honeycomb structure is very minute in the shape and has a very thin thickness of partition wall, so that it is very difficult to flatly cut the extrusion molded body without breaking its shape and there is yet existent no proper cutting apparatus. Therefore, the cutting operation was usually carried out by the worker through an extreme fine steel wire and a jig.

In the cutting of the extrusion molded body through manual operation as mentioned above, however, the operation efficiency is low in case of mass production, and also the long time is required for mastering the technique and further there are problems in view of the yield.

Particularly, since many through-holes divided by thin partition walls extend toward the longitudinal direction of the extrusion molded body for ceramic honeycomb structures, if the breaking of the extrusion molded body is caused during the cutting, it is transmitted backward in the extrusion direction due to the dead weight of the extrusion molded body in addition to the broken portion at the cutting position, and consequently the deformation area is enlarged in the longitudinal direction.

Moreover, the extreme fine steel wire used in the cutting operation is small in the diameter (for example, 0.1–0.05 mm), so that the breaking of the wire is apt to be caused by a manner of applying force.

SUMMARY OF THE INVENTION

It is, therefore, an object of the invention to solve the above mentioned drawbacks of the prior art.

According to the invention, there is the provision of a cutting apparatus for ceramic green shaped bodies comprising:

a cutting frame having a pair of arm portions arranged side by side in the widthwise direction of the ceramic green shaped body;

a cutting fine wire directly extending about the two arm portions through a roll arranged in each of the arm portions, both free ends of which being joined to two springs connected at opposite ends with each other;

means for moving the arm portions toward a cutting direction of the ceramic green shaped body and cutting the cutting fine wire extended about the rolls into the ceramic green shaped body; and means for reciprocately moving the cutting fine wire where at least one reciprocating motion of the cutting fine wire extended about the rolls is carried out during the moving of the cutting fine wire across the ceramic green shaped body while moving the arm portions toward the cutting direction of the ceramic green shaped body.

According to the invention, the arm portions are moved in the cutting direction of the ceramic green shaped body by the arm portion moving means, whereby the ceramic green shaped body is cut into a given length through the cutting fine wire extended about the arm portions.

During the cutting of the ceramic green shaped body, the cutting fine wire is reciprocatedly moved by the means for the reciprocating motion of the cutting fine wire, whereby "draw-cut" operation is added to such a cutting operation. Thus, the cutting operation efficiency can be improved. Further, the addition of "draw-cut" operation can enhance the effect of preventing the occurrence of deformation and breaking of the ceramic green shaped body and further improve the yield.

BRIEF DESCRIPTION OF THE DRAWINGS

The invention will be described with reference to the accompanying drawings, wherein.

DESCRIPTION OF THE PREFERRED EMBODIMENTS

Figure 1:
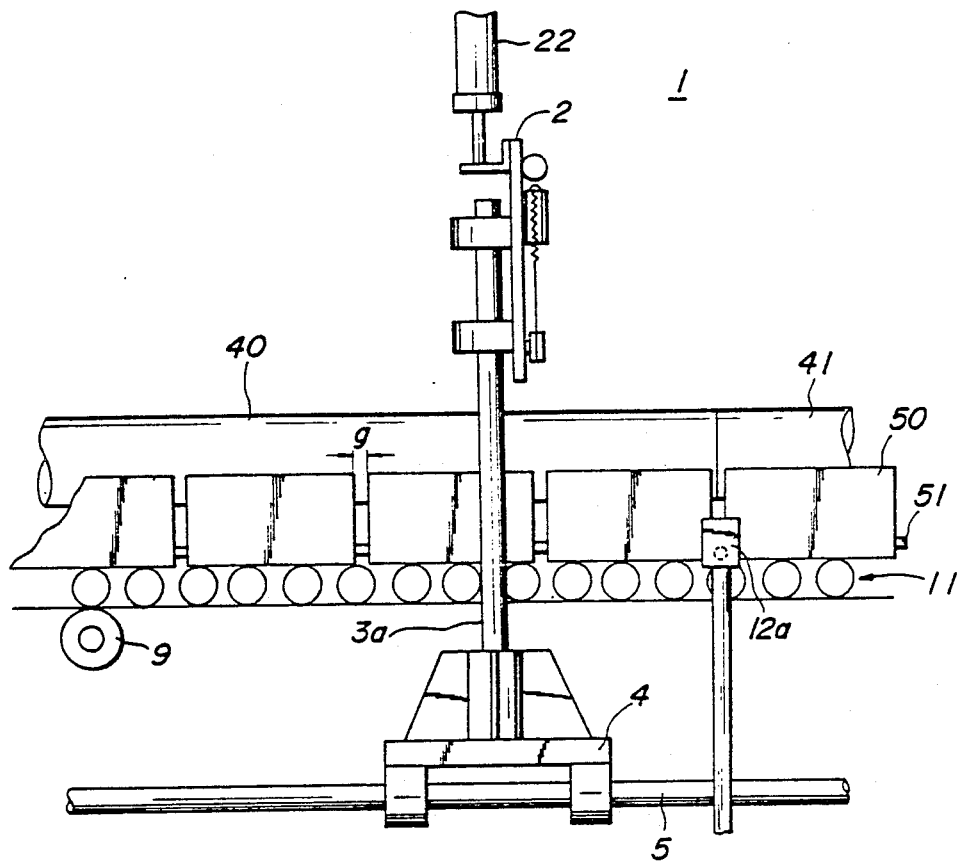
FIG. 1 is a side view illustrating an embodiment of the cutting apparatus according to the invention.
Figure 2:
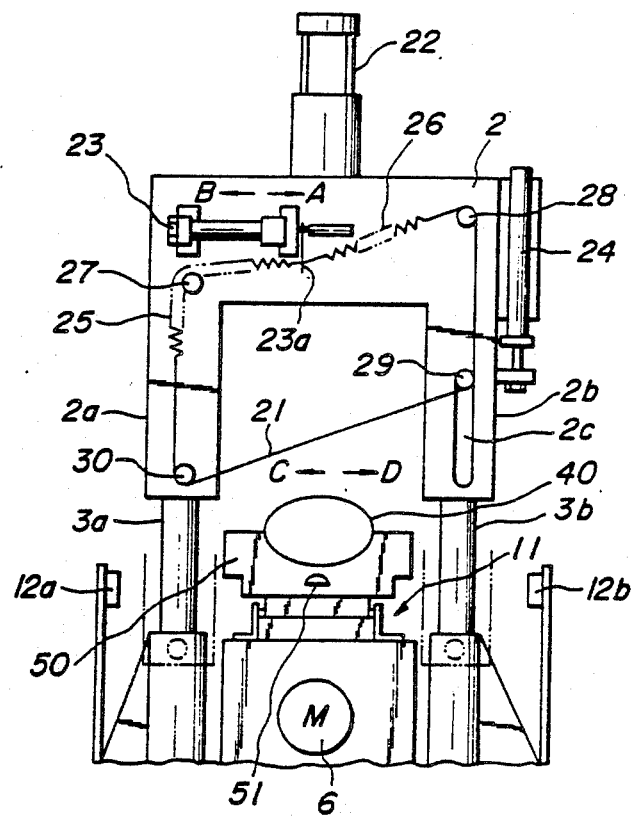
FIG. 2 is an elevational view of the cutting apparatus viewed from right-hand side of FIG. 1.

FIG. 1 is a side view of one embodiment of the cutting apparatus according to the invention, and FIG. 2 is an elevational view from right-hand side of FIG. 1.

As shown in FIGS. 1 and 2, the cutting apparatus 1 in this illustrated embodiment comprises a roller conveyor 11 for the transportation of support bases 50 supporting an extrusion molded body 40 (i.e. ceramic green shaped body for honeycomb structures continuously extruded from an extrusion molding apparatus), a pair of travelling bases 4 arranged on both sides of the roller conveyor 11 and moved in parallel with each other forward and backward by a feed mechanism 5, and a cutting frame 2 supported by struts 3a, 3b each stood on a travelling base 4.

Furthermore, an encoder 9 is arranged side the roller conveyor 11 at a position behind the cutting frame 2. This encoder 9 detects a rotational speed of a roller in the roller conveyor 11, from which a moving speed of the extrusion molded body 40 can indirectly be detected.

As shown in FIG. 2, the cutting frame 2 is provided on the front face with a pair of arm portions 2a and 2b arranged downward side by side in the widthwise direction of the extrusion molded body 40 transferred on the roller conveyor 11. A roll 30 is secured to a front end portion of the arm portion 2a, while a roll 29 is attached to a middle part of the arm portion 2b so as to move in a slit 2c formed in the arm portion 2b.

In the cutting frame 2, a roll 27 and a cylinder 23 are secured above the arm portion 2a, while a roll 28 is secured above the arm portion 2b.

A fine wire (e.g. steel wire of 0.1–0.05 mm$\phi$) 21 is straightly extended about the rolls 29 and 30, both free ends of which are joined to one ends of two springs 25, 26 having different spring constants and fixed at their other ends to an actuator 23a of the cylinder 23, in which the fine wire 21 passes through the roll 28 located above the arm portion 2b and the spring 25 passes through the roll 27. Thus, the fine wire 21 forms a ring taking the actuator 23a as starting and end points.

The cutting frame 2 is moved in up and down directions along the struts 3a, 3b by an elevating cylinder 22, while the cylinder 23 moves the actuator 23a in the horizontal direction. Further, a cylinder 24 for moving the roll 29 is disposed on the side wall of the arm portion 2b to push the roll 29 downward to the lower end of the slit 2c.

The feed mechanism 5 is driven by the actuation of a D.C. servomotor 6 to move the travelling base 4, whereby the cutting frame 2 is also moved in parallel with the extrusion molded body 40 in the moving direction thereof.

Furthermore, two photoelectric switches 12a, 12b are arranged in opposition to each other on both sides of the roller conveyor 11 below the cutting frame 2. These photoelectric switches 12a, 12b detect the passage of gap g between support bases 50 transferring on the roller conveyor 11 (as shown in FIG. 1).

The gap g is formed between the two support bases 50 by contacting a spacer 51 protruded from the front and lower face of the support base 50 with the back face of the other support base 50.

The operation of the cutting apparatus 1 will be described below.

The cutting frame 2 stands by the upper position prior to the cutting operation as shown in FIG. 2. At this state, as the gap g between the support bases 50 transferring together with the extrusion molded body 40 on the roller conveyor 11 arrives at the position of the photoelectric switches 12a, 12b, the arrival of the gap is detected by the photoelectric switches 12a, 12b to supply the detected signal to a control panel (not shown), and consequently the cylinder 22 is driven in response to this detected signal.

The cutting frame 2 begins to descend downward by the driving of the cylinder 22. The descent timing of the cutting frame 2 is so controlled that the position of the fine wire 21 first contacting with the top surface of the extrusion molded body 40 is existent in a plane including the gap g in the descending of the cutting frame 2. That is, this control is performed by operations taking the passage timing of the gap g as well as the moving speed of the extrusion molded body 40 detected by the encoder 9.

The cutting of the extrusion molded body 40 is carried out by descending the cutting frame 2 to cut the fine wire 21 into the body 40. In this case, the feed mechanism 5 is driven by the actuation of the D.C. servomotor 6, whereby the cutting frame 2 is moved in the moving direction of the extrusion molded body 40 at a speed equal to the moving speed of the body 40 detected by the encoder 9. Thus, the fine wire 21 is moved together with the extrusion molded body 40 while descending in a plane inclusive of the gap g during the cutting operation, so that the cut surface of the extrusion molded body 40 becomes a plane perpendicular to the moving direction of the body 40.

According to the invention, the same "draw-cut" operation as in the manual operation is introduced into the motion of the fine wire 21 in the cutting of the extrusion molded body 40. That is, when the fine wire 21 is tensioned horizontally and pushed against the outer top surface of the extrusion molded body 40 as it is, the body 40 is apt to be deformed by the resistance to the cutting, so that the draw-cut operation is carried out by pushing the fine wire 21 against the extrusion molded body 40 while slantingly tensioning between rolls 29 and 30 as shown in FIG. 2 and at the same time reciprocately moving the fine wire 21 toward the widthwise direction of the extrusion molded body 40.

The draw-cut operation will be described with reference to FIGS. 3–5.

Figure 3:
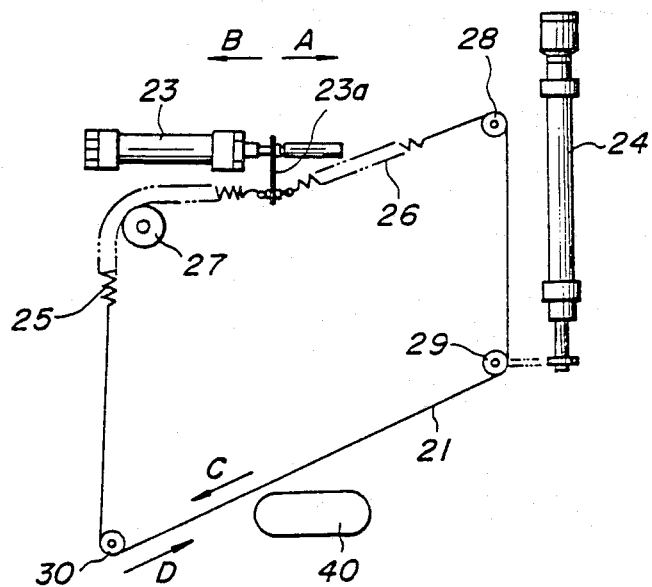
FIGS. 3-5 are operational diagrams for the cutting apparatus according to the invention, respectively.

Just before the fine wire 21 is contacted with the extrusion molded body 40 by descending the cutting frame 2 (or before the beginning of the cutting), the cylinder 23 is actuated to gradually push the actuator 23a toward a direction of arrow A in FIG. 3.

As a result, the fine wire 21 is pulled in a direction of arrow C by the spring 25 and pushed onto the extrusion molded body 40 while sliding during the descending of the cutting frame 2. In this case, the position of the roll 29 is higher than that of the roll 30, so that the fine wire 21 is diagonally cut into the extrusion molded body 40. Thus, the pushing force of the fine wire 21 against the extrusion molded body 40 can be mitigated in the cutting, whereby the breaking of the body at the cutting position can effectively be prevented.

Since a given elasticity is applied to the fine wire 21 by the springs 25 and 26, when the fine wire 21 is contacted with the extrusion molded body 40, it becomes curved in correspondence with the profile of the extrusion molded body 40, and consequently the pushing force is gentler as compared with a case of pushing the fine wire 21 under a tension, which can prevent the deformation of the extrusion molded body 40 due to excessive force.

In this way, the cutting of the extrusion molded body 40 is started. Then, the draw-cut operation of the fine wire 21 to the extrusion molded body 40 is made with the descending of the cutting frame 2 to promote the cutting of the extrusion molded body 40.

Figure 4:
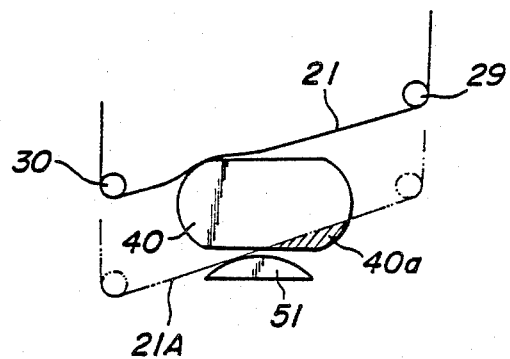
Figure 5:
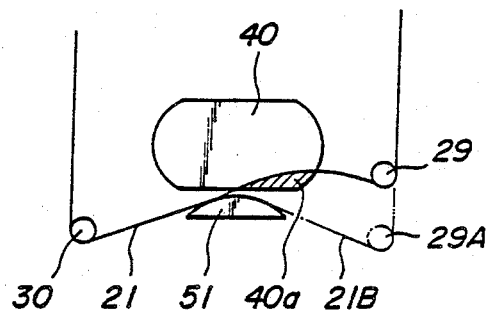

When the cutting frame 2 arrives at the lowest position (or a position of contacting the fine wire 21 with the upper surface of the spacer 51 as shown by a phantom line 21A in FIG. 4), the driving of the cylinder 22 is stopped, and also the pushing operation of the actuator 23a in the cylinder 23 is stopped.

Then, the cylinder 23 is driven in the opposite direction to gradually return the actuator 23a in a direction of arrow B in FIG. 3. At this time, the cylinder 24 is driven to gradually descend the roll 29 downward.

At such a state that the cutting frame 2 reaches the lowest position, the fine wire 21 remains in the interior of the extrusion molded body 40 as shown in FIG. 4, so that it is necessary to further cut the remaining uncut portion 40a of the extrusion molded body 40, which is attained by descending the roll 29 downward.

Further, if it is intended to cut the extrusion molded body 40 by descending the fine wire 21 at the same slanting state as in FIG. 4 without reciprocating motion, the cutting is always performed at the same portion of the fine wire 21, so that the fine wire 21 is liable to be broken. And also, since the descending distance of the cutting frame 2 becomes longer, it is necessary to make the height of the cutting apparatus itself high. These inconveniences can be solved by the draw-cut operation of the fine wire and the descending operation of the roll as mentioned above.

While the cutting of the uncut portion 40a is carried out by the descending of the roll 29, the actuator 23a is returned backward to pull the fine wire 21 in a direction of arrow D in FIG. 3. Therefore, the cutting of the uncut portion 40a is also attained by the draw-cut operation. In this case, the pushing force of the fine wire 21 against the extrusion molded body 40 is mitigated by the elasticity of the springs 25, 26 (i.e. it is permitted to curve the fine wire 21 as shown in FIG. 5).

When the roll 29 arrives at the lowest position, the extrusion molded body 40 is completely cut by the fine wire 21. In this case, the fine wire 21 contacts with the top surface of the spacer 51 as shown by a phantom line 21B in FIG. 5 (the fine wire can not come out of the gap g because the support base 50 contacts with the front support base through the spacer 51). Since the top surface of the spacer 51 is shaped into a gentle arc form, excessive force is not applied to the fine wire 21, so that there is no fear of breaking the fine wire.

Thereafter, the cutting frame 2 is raised upward to the original position, and also the cylinder 24 is returned to the original position, whereby the cutting apparatus 1 is stood by till the next starting time of the cutting operation. In this case, the D.C. servomotor 6 is driven in the opposite direction to return the travelling base 4 to the original position.

Thus, the cutting apparatus 1 can perform the cutting of the extrusion molded body 40 at every gap g between the support bases, so that a single part 41 is produced at a supported state every the support base 50. Therefore, the length of the support base 50 is previously designed to be approximately equal to the cut length of the extrusion molded body 40.

Further, the draw-cut operation is adopted in the cutting apparatus 1, so that the cutting operation can rapidly be performed without causing the deformation and breakage of the extrusion molded body 40.

Since the greater part of the fine wire 21 is used in the cutting by the above draw-cut operation, the consuming degree of the fine wire 21 is small and the service life thereof becomes longer as compared with the case of using only a part of the fine wire for cutting (i.e. a case of fixing the fine wire without performing the draw-cut operation).

Although the invention has been described with respect to the cutting apparatus 1 for use in the cutting of the ceramic green shaped body (or extrusion molded body) produced in the manufacture of ceramic honeycomb structures. it is apparent that the invention is widely applicable to cutting apparatuses for other ceramic green shaped bodies (such as porcelain articles and so on).

In the above illustrated embodiment, the draw-cut operation is carried out by one reciprocating motion of the fine wire 21 for every cutting operation, but it is naturally possible to perform the reciprocating motion two times or more every cutting operation.

Although the illustrated embodiment shows such a constructin that the fine wire 21 is extended in a ring form and reciprocatedly moved by the actuation of the cylinder 23, the invention is not intended to limit to the above construction. For instance, there may be adopted a construction that the fine wire 21 is connected at both ends to separate actuators and alternately drawn by the driving of these actuators, a construction that the fine wire 21 is connected at both ends to a balance-like actuator and drawn by the pivoting of the actuator, and so on.

As previously mentioned in detail, according to the invention, the arm portions provided with the cutting fine wire extended therebetween are moved by the arm portion moving means toward the cutting direction of the ceramic green shaped body to cut this body by the cutting fine wire and also the draw-cut operation is introduced into the cutting operation, whereby the occurrence of deformation and breakage of the ceramic green shaped body can surely be prevented.

Further, the cutting frame is moved toward the moving direction of the extrusion molded body during the descending, whereby the cut surface of the extrusion molded body can be made into a plane perpendicular to the moving direction of the body. Moreover, the high yield can be attained together with the rapid cutting operation, which may correspond to mass production.

And also, the service life of the fine wire can be prolonged by the above draw-cut operation, so that the exchange operation of the cutting fine wire every the breaking can be reduced.

In addition, it is not necessary to train specialists as in the conventional cutting by manual operation, so that the number of workers can be reduced, which contributes to the reduction of production cost.

What is claimed is:

1. A cutting apparatus for ceramic green shaped bodies comprising:
    a cutting frame having a pair of arm portions arranged side by side in the widthwise direction of the ceramic green shaped body, each arm having a front end adjacent the ceramic green shaped body and a rear end opposite said front end, a middle area being located between said front and rear ends;
    two rolls attached to the two arm portions, a first one of said rolls being attached to the front end of one of the two arm portions and a second one of said rolls being movably attached to the middle area of the other of the two arm portions;
    a cutting fine wire having a diameter of 0.1–0.05 mm and directly extending about the two arm portions through the roll arranged in each of the arm portions, both free ends of said wire being joined to two springs connected at opposite ends with each other;
    means for moving the arm portions in a cutting direction of the ceramic green shaped body to a cutting position, and cutting the fine wire extended about the rolls into the ceramic green shaped body;
    means for reciprocally moving the second roll from the middle area to the front end of the other arm portion after the means for moving the arm portions moves the arm portions to the cutting position; and
    means for reciprocally moving the cutting fine wire where at least one reciprocating motion of the cutting fine wire extended about the rolls is carried out during the moving of the cutting fine wire across the ceramic green shaped body while moving the arm portions in the cutting direction of the ceramic green shaped body.

2. The cutting apparatus according to claim 1, wherein said ceramic green shaped body is a material for ceramic honeycomb structures.

3. The cutting apparatus according to claim 1, wherein said means for reciprocatedly moving the cutting fine wire is an air cylinder.

* * * * *